United States Patent
Ewert et al.

(10) Patent No.: US 7,711,357 B2
(45) Date of Patent: May 4, 2010

(54) METHOD FOR ENABLING A LOCATION SERVICE CLIENT TO CONTACT A USER OF A MOBILE DEVICE

(75) Inventors: Jörg Ewert, Erkelenz (DE); Martin Stumpert, Hochspeyer (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 334 days.

(21) Appl. No.: 10/520,300

(22) PCT Filed: Jul. 18, 2003

(86) PCT No.: PCT/EP03/07812

§ 371 (c)(1),
(2), (4) Date: Jan. 5, 2005

(87) PCT Pub. No.: WO2004/016011

PCT Pub. Date: Feb. 19, 2004

(65) Prior Publication Data

US 2005/0255853 A1 Nov. 17, 2005

(30) Foreign Application Priority Data

Aug. 7, 2002 (EP) .................................. 02017557

(51) Int. Cl.
*H04M 3/00* (2006.01)
*H04W 40/00* (2009.01)
*H04W 24/00* (2009.01)

(52) U.S. Cl. .................. 455/418; 455/445; 455/456.2; 340/825.49; 709/217; 709/201

(58) Field of Classification Search ... 455/456.1–456.6, 455/414.1–414.4, 404.2; 701/201, 207, 209, 701/213; 340/994, 988, 825.491; 709/217
See application file for complete search history.

(56) References Cited

U.S. PATENT DOCUMENTS 5,561,704 A 10/1996 Salimando (Continued)

FOREIGN PATENT DOCUMENTS

WO    WO 00 04730 A    1/2000

OTHER PUBLICATIONS

"Digital cellular telecommunications system (Phase 2+) (GSM); Universal Mobile Telecommunications System (UMTS); Functional stage 2 description of location services (3GPP TS 23.271 version 5.3.0 Release 5); ETSI TS 123 271 V5.3.0 (Jun. 2002)" ETSI TS 123 271 V5.3.0, Jun. 2002, XP002227478.
European Patent Office, International Search Report for PCT/EP03/07812, dated Oct. 14, 2003.

*Primary Examiner*—William D Cumming
(74) *Attorney, Agent, or Firm*—Roger S. Burleigh

(57) ABSTRACT

A method for sending (700) information enabling a contacting of a user of a mobile device (MS) to at least one location service client (CL1,CL2) is disclosed. The method comprises the steps of selection (200) of a type of location service clients on the mobile device (MS), transmission (300) of a type identifier from the mobile device (MS) to a server (NS) in a telecommunication system, the type identifier identifying the selected type of location service clients, analysis (400) of the type identifier for a determination (500) of one or more location service clients (CL1,CL2) associated (100) with the selected type of location service clients, determination (600) of at least one address of the one or more determined location service clients (CL1,CL2) according to a result of the analysis (400), and sending (700) information enabling the contacting of the user to the one or more location service clients (CL1, CL2) whose addresses are determined.

10 Claims, 6 Drawing Sheets

U.S. PATENT DOCUMENTS

| | | | |
|---|---|---|---|
| 5,945,919 A * | 8/1999 | Trask | 340/825.49 |
| 6,108,554 A | 8/2000 | Kawamoto | |
| 6,526,275 B1 * | 2/2003 | Calvert | 455/418 |
| 6,615,046 B1 * | 9/2003 | Ur | 455/445 |
| 6,756,913 B1 * | 6/2004 | Ayed | 340/825.49 |
| 7,050,818 B2 * | 5/2006 | Tendler | 455/456.2 |
| 2001/0004600 A1 | 6/2001 | Son et al. | |
| 2003/0020637 A1 * | 1/2003 | Ricard | 340/988 |
| 2003/0054837 A1 * | 3/2003 | Ennis | 455/456 |
| 2003/0172125 A1 * | 9/2003 | Batra et al. | 709/217 |
| 2004/0177109 A1 * | 9/2004 | Lee | 709/201 |

\* cited by examiner

METHOD FOR ENABLING A LOCATION SERVICE CLIENT TO CONTACT A USER OF A MOBILE DEVICE

TECHNICAL FIELD OF THE INVENTION

The present invention relates to the field of telecommunication systems, especially to a method for sending information enabling a contacting of a user of a mobile device to at least one location service client.

BACKGROUND OF THE INVENTION

Obtaining the location of a user of a mobile device in a mobile telecommunication system via a LCS (LoCation Service) is possible e.g. according to $3^{rd}$ Generation Partnership Project (3GPP) Technical Specification (TS) 23.272 Version (V)5.3.0, Release 5, published June 2002 (2002-06). In a GSM (Global System for Mobile Communication) or UMTS (Universal Mobile Telecommunication System) system, the location of the user can be determined using accurate radio signal measurements and a position estimate computation based on the measurements. The location of the user may be indicated by a geographical coordinate with the accuracy of a few meters.

The mobile device can request its own location and can send its location via a GMLC (Gateway Mobile Location Center) to a LCS client, e.g. for using a LBS (Location Based Service). A location request initiated by the mobile device is also named MO-LR (Mobile Originating Location Request) and can be carried out in the CS (Circuit Switched) domain, i.e. CS-MO-LR, as well as in the PS (Packet Switched) domain, i.e. PS-MO-LR.

If the mobile device is requesting that its own location is to be sent to a LCS client, the mobile device can send a service invoke message to a VMSC/MSC (Visited Mobile services Switching Center/Mobile services Switching Center) for a CS-MO-LR or to a SGSN (Serving General packet radio service Support Node) for PS-MO-LR or to both. The service invoke message includes the identity of the LCS client and optionally the address of the GMLC. If the GMLC address is not included, the VMSC/MSC or the SGSN, respectively, may assign its own GMLC address and may verify that the identified LCS client is supported by this GMLC. If a GMLC address is not available for this case, the VMSC/MSC or the SGSN, respectively, can reject the MO-LR. Else, the VMSC/MSC or the SGSN sends a MAP (Mobile Application Part) subscriber location report or subscriber LCS report message, respectively, comprising the MSISDN (Mobile Station Integrated Services Digital Network Number) or PDP (Packet Data Protocol) address of the mobile device, the identity of the LCS client and further information like a location estimate of the mobile device, the event causing the location estimate and the age of the location estimate. On receipt of the subscriber LCS report message, the GMLC sends the location of the mobile device to the LCS client.

MO-LR mechanisms as described so far are capable to address only one LCS client for one MO-LR. Addressing of multiple LCS clients requires multiple MO-LRs, which is time and resource consuming. Furthermore, an identity of the LCS client must be known to the mobile device to be included in the service invoke message. This strongly limits the application of the present MO-LR mechanisms to known LCS clients. In addition, the present MO-LR mechanisms only allow to send the location of a mobile device to a LCS client preventing the LCS client to provide service information to the user of the mobile device in response to the receipt of the location information.

SUMMARY OF THE INVENTION

It is therefore an object of the present invention to provide methods, devices and computer programs that allow a sending of information to multiple and/or unknown location service clients with said information enabling a contacting of a user of a mobile device.

This object is achieved by the methods as described in claims 1, 2, and 7. Furthermore, the invention is embodied in devices as described in claims 12 and 18 and in computer programs as described in claims 20 and 21. Advantageous embodiments are described in the further claims.

For sending information enabling a contacting of a user of a mobile device to at least one location service client the following steps are performed. First, a selection of a type of location service clients is executed on the mobile device. The selection is preferably controlled by the user and can be achieved by scrolling a list of types of location service clients from that a type of location service clients is selected. The list may be loaded from an entity of the telecommunication system prior to the selection of the type of location service clients. Alternatively, the user may enter the selected type of location service clients into the mobile device, e.g. by entering a name for the type of location service clients.

After the selection of the type of location service clients, a transmission of a type identifier from the mobile device to a server in a telecommunication system is performed. The type identifier identifies the selected type of location service clients. The relation between the selected type of location service clients and the transmitted type identifier must be unique for the mobile device and the server for identifying the selected type of location service clients from the mobile device to the server. The type identifier may be loaded to a storage of the mobile device, e.g. it can be downloaded in conjunction with a list of types of location service clients. Triggered by the selection of the type of location service clients, the corresponding type identifier can be retrieved from the storage for transmission. Alternatively, the type identifier may be entered by the user to the mobile device. The transmission of the type identifier may be accompanied by a request for sending information enabling the contacting the user to one or more location service clients according to the type identifier. Furthermore, the information enabling the contacting of the user or an indication for the server where to find the information enabling the contacting of the user and/or which information enabling the contacting of the user can be sent in conjunction with the transmission of the type identifier. Information for a location service client of the selected type of location service clients may be sent or indicated from the mobile device to the server in parallel to the transmission of the type identifier.

An analysis of the type identifier for a determination of one or more location service clients associated with the selected type of location service clients is executed. The analysis can be triggered by the receipt of the type identifier or by a corresponding request accompanying the type identifier as mentioned before. In the proposed method, one or more location service clients can be associated with one or more types of location service clients. A type of location service clients may be associated with a common attribute of one or more location service clients in order to distinguish the one or more location service clients of said type from further location service clients. For example, a type of location service clients may represent the type RESTAURANT or TRANSPORTATION. The association of a location service client to multiple types of location service clients is possible. From the knowledge of the type identifier, the server can identify the selected type of location service clients and can thus determine the one or more location service clients being associated with the selected type. This determination may be achieved by searching a database comprising at least the selected type identifier linked to the one or more location service clients that are associated with the selected type of location service clients.

Based on a result of the previous analysis, a determination of at least one address of the one or more determined location service clients is executed. An address may be derived from a profile of a location service client comprising e.g. the identity or name of the location service client, an address enabling the contacting of the location service client, one or more types of location service clients said location service client is associated to, and one or more corresponding type identifiers. If multiple addresses are comprised in a profile of a location service client, all addresses may be determined or a selection of one or more of the addresses may be performed, e.g. based on preferences by the location service client or the server. Profiles of location service clients are preferably stored at the server or are at least accessible by the server.

Finally, the sending of information enabling the contacting of the user to the one or more location service clients whose addresses are determined is executed. The information enabling the contacting of the user can be used by a location service client that received this information to contact the user and can comprise a user identity identifying the user to the location service client or an address of the user or both. Multiple user identities or addresses or both are possible and the information enabling the contacting of the user can be different for different location service clients. Examples for information enabling the contacting of the user are a MSISDN number, an IMSI (International Mobile Subscriber Identity) of the user, or a name or alias of the user combined with an address like a postal address. Also email, fixed phone, fax, or post box addresses can be used. Information enabling the contacting of the user can be stored on the server or can be provided to the server, e.g. in conjunction with the transmission of the type identifier. For example, the information enabling the contacting of the user can origin from the mobile device or a different entity of the telecommunication system like a HSS (Home Subscriber Server), a HLR (Home Location Register), an AAA (Authentication, Authorization and Accounting) server, a MSC (Mobile services Switching Center) or a SGSN. The contacting of the user from a location service client that received the information enabling the contacting of the user can be achieved in a way that service information is sent from said location service client to a user accessible receiving entity where the user can obtain said service information.

The proposed method solves the problem of sending information enabling a contacting of a user of a mobile device to multiple and/or unknown location service clients. A conceptual change from the knowledge, transmission and analysis of individual identities of location service clients to the knowledge of types of location service clients with the transmission and analysis of type identifiers is introduced by the invention. For sending of information enabling the contacting of the user to location service clients, the user or the mobile device for the user do not necessarily have to know about the existence of one or more particular location service clients or to know the number of location service clients or their corresponding individual identities as it is in prior art. Instead, the user or the mobile device for the user must be aware about at least one type of location service clients that is to be selected and indicated to the server for sending information enabling the contacting of the user to the user. Also the transmission effort and processing effort for the generation and the processing of involved messages and related information can be reduced by the proposed method. Instead of sending multiple identities of location service clients as it is in prior art, a type identifier corresponding to the selected type of location service clients is transmitted. The transmission of the type identifier can be achieved in a single message instead of multiple messages necessary for the transmission of multiple identities of location service clients according to prior art. Thus, multiple location service clients of the selected type of location service clients and their respective addresses can be determined based on a single message. In addition, the one or more location service clients whose addresses are determined can be notified with information enabling the contacting of the user thus providing a notified location service client, i.e. a location service client of the selected type of location service clients to whom information enabling the contacting of the user is sent from the server, with the possibility to contact the user to provide adequate service to the user.

Furthermore, the proposed method is very flexible and convenient especially for a notified location service client and the user. Depending on the information enabling the contacting of the user provided to the notified location service client and its ability for making the contact to the user, the user can be contacted by a notified location service client in many ways. Typically, the user can access a large variety of user accessible receiving entities that can be offered to a notified location service client for the contacting of the user. In general, a user accessible receiving entity can be any device or institution or address identifiable and contactable by a notified location service client based on the information enabling a contacting of the user for contacting the user. Preferably, the user is provided with service information sent from a notified location service client to the user accessible receiving entity where the user can access the service information. Examples for a user accessible receiving entity are a mobile device either being the initial mobile device, i.e. the mobile device triggering the sending of information enabling the contacting of the user to the one or more location service clients of the selected type of location service clients or a different mobile device accessible by the user. Other devices allowing the contacting of the user by a notified location service client are possible, e.g. a computer that enables a user to access an email sent from a notified location service client, or a pager. In addition or alternatively, a user accessible receiving entity may be a company or a place of living of the user, or a post office. Depending on the information enabling the contacting of the user, a notified location service client may also contact more than one user accessible receiving entities for contacting the user. Different location service clients may contact different user accessible receiving entities.

It is preferable to execute a part of the steps of the previously described method on the server as described in the following. A method for sending information enabling a contacting of a user of a mobile device to at least one location service client wherein the following steps are performed by a server of a telecommunication system. These steps are receiving from the mobile device a type identifier identifying a selected type of location service clients, analysis of the type identifier for a determination of one or more location service clients associated with the selected type of location service clients, determination of at least one address of the one or more determined location service clients according to a result of the analysis, and sending information enabling the contacting of the user to the one or more location service clients whose addresses are determined.

For offering a location based service that takes into account location information associated with the user it is especially advantageous to provide a notified location service client with location information associated with the user. This can be achieved by sending location information associated with the user to the one or more location service clients whose addresses are determined. The location information associated with the user can be a location or an area or both, e.g. an area surrounding a location. The location/area may be a current location/area of the user or a location/area different from the current location/area. Location information associated with the user can be represented by geographical coordinates for specifying a location or an area. A radius can be used to indicate an area surrounding a location. Alternatively or in addition, predetermined areas like countries or districts of towns or areas relating to the mobile telecommunication system the mobile device of the user is attached to can be used, e.g. location information associated to the user may be based on a PLMN (Public Land Mobile Network) area, a LA (location area), a SA (service area), or a RA (routing area). The location information associated with the user can be entered into the mobile device for transmission to the server or may be determined by one or more entities of the mobile telecommunication system the mobile device of the user is attached to. The server can receive this location information associated with the user from the mobile device of the user, e.g. in combination or in parallel with the transmission of the type identifier, or from other entities of the telecommunication system. The location information associated with the user enables a notified location service client to offer a location based service that takes into account the location information associated with the user, e.g. for providing the user with a way description from the location as given in the location information associated with the user to the location of the location service client or for charging purposes depending on the distance of the location associated with the location service client and the location associated with the user. A notified location service client may use received location information associated with the user for checking purposes, e.g. the notified location service client may verify if a location or area given by the location information associated with the user is served by the notified location service client. If it is not served, a contacting of the user may not be executed.

According to a preferred embodiment, a threshold number is received that indicates a limit for a number of location service clients. The threshold number can be received by the server in a sense that an operator or the user sets the threshold number. Furthermore, a determination that the threshold number is reached can be executed and the number of the one or more location service clients to those information enabling the contacting of the user is to be sent to can be limited to the threshold number. In combination with the determination of the one or more location service clients of the selected type of location service clients it can be checked if the threshold number is reached. If it is determined that the threshold number is reached, the number of the determined one or more location service clients can be limited to the threshold number, i.e. the determination of location service clients of the selected type of location service clients is terminated when the threshold value is reached. The limitation has especially the advantage to avoid that the user selects unintentionally a type of location service clients wherein more location service clients than expected by the user are associated to. The threshold value can set a reasonable limit and avoids that to all location service clients of the selected type information enabling the contacting of the user is sent. Instead of terminating the determination of location service clients of the selected type of location service clients when the threshold value is reached as explained before, the server may continue with the determination and determine also one or more location service clients of the selected type of location service clients exceeding the threshold value. Preferably, the server indicates those one or more location service clients exceeding the threshold value for distinguishing them from the one or more location service clients that are determined up to the threshold value. This alternative procedure allows a more flexible processing of the one or more location service clients that are associated to the selected type of location service clients and may especially be interesting for charging purposes. For example, the sending of information enabling the contacting of the user to one or more location service clients of the selected type of location service clients up to the threshold value may be charged differently than for one or more location service clients of the selected type of location service clients exceeding the threshold value. Of course, the alternative procedure can be implemented such that only those of the one or more location service clients of the selected type of location service clients up to the threshold value are notified with information enabling the contacting of the user.

According to another preferred embodiment, location information associated with the user of the mobile device and location information associated with the one or more location service clients of the selected type of location service clients are considered such that the sending of information enabling the contacting of the user is restricted to those of the one or more location service clients whose location information matches the location information associated with the user. The location information associated with the user that is used for restriction can be identical or can be different from the location information associated with the user that can be used for sending to the one or more location service clients. In general, location information used for restriction may be a location or an area or both, e.g. an area surrounding a location. The location may be a current location/area of the user or of a location service client of the selected type of location service clients or a location/area different from the respective current location/area. The location information associated with the user may be received from the mobile device, e.g. in combination with the transmission of the type identifier, may be provided from other entities of the telecommunication system, or may be stored at the server. Especially if the location service clients have a fixed or predictable location, location information associated with the one or more location service clients is preferably stored at the server. The location information associated with a location service client can be collected when associating the location service client to a type of location service clients. The location information associated with a location service client can be added to a profile of the location service client. The restriction of the one or more location service clients of the selected type of location service clients may be achieved by retrieving the location information associated with the one or more location service clients from the respective profiles and checking the retrieved location information versus the location information associated with the user in such a way that only those location service clients of the selected type are notified with information enabling the contacting of the user that are located in an area associated with the user. Other procedures or requirements for achieving the restriction are possible. Depending on the location information associated with the user and the location information associated with the one or more location service clients and the way of processing the respective location information, the number of location service clients that are to be notified with information enabling the contacting of the user can range from zero to all location service clients associated with the selected type of location service clients. The restriction is especially useful for both, the user and a location service client of a selected type of location service clients, as it introduces a procedure to satisfy location requirements of the user and location requirements of the location service client. It is especially advantageous to implement the restriction functionality in the server to avoid the notification of a location service client of the selected type of location service clients whose location requirement does not fulfill the location requirement of the user or vice versa.

It is especially helpful for the user if the current location of the mobile device is used for the location information associated with the user. The current location of a mobile device can be determined by the mobile telecommunication system. Improved convenience and security can be the consequence as the user does not have to know and/or enter his current location.

It is preferable to execute a part of the steps of the previously described method on the mobile device of the user as described in the following. A method for sending information enabling a contacting of a user of a mobile device to at least one location service client wherein the following steps are performed by the mobile device. These steps are selection of a type of location service clients on the mobile device and sending of a type identifier to a server in a telecommunication system, the type identifier identifying the selected type of location service clients. Correspondingly, the mobile device can request the server to send information enabling the contacting of the user to one or more location service clients that are associated with the selected type of location service clients.

According to a preferred embodiment, multiple types of location service clients exist and the selected first type of location service clients is composed of at least two of the multiple types of location service clients. The introduction of multiple types of location service clients makes the method more versatile as it allows an association of location service clients to multiple types, e.g. RESTAURANT, TRANSPORTATION, BUSINESS, etc. providing more choices for the user. For providing a finer selection, it is advantageous to compose types, e.g. to combine type RESTAURANT with type CHINESE to compose the type CHINESE RESTAURANT. The composing can be executed during the selection of the type of location service clients. It depends on the implementation whether a type identifier representing the composed type of location service clients is sent to the server or multiple type identifiers. In the latter case, the mobile device sends a list of type identifiers that represents the composed type of location service clients that is selected to the server. The server can recognize the composed type of location service clients from an analysis of the multiple type identifiers and can thus determine the corresponding location service clients.

In order to give a feedback to the user on the one or more location service clients whose addresses are determined on the server, another preferred embodiment provides that the one or more location service clients whose addresses are determined are indicated on the mobile device of the user. A message comprising an indication of the one or more location service clients whose addresses are determined can be sent to the mobile device providing the user with information on said location service clients of the selected type of location service clients. In parallel, charging information may be provided to the user, e.g. for informing the user about the cost of the notification per location service client whose address is determined. The message mentioned before may be sent prior to the sending of information enabling the contacting of the user e.g. in order to provide the user with an option for a selection of the one or more location service clients that are to be notified with information enabling the contacting of the user. This selection has the advantage that the user can control which of the one or more location service clients whose addresses are determined is notified and/or which is not notified. Alternatively, the message may be sent in parallel with or after the sending of information enabling the contacting of the user e.g. for providing the user with a report on the notified location service clients.

In order to keep the implementation effort low for the proposed method, at least the transmission of the type identifier can be executed in a mobile originated location request. Consequently, the type identifier of the selected type of location service clients can replace the identity of the location service client in the service invoke message sent from the mobile device via a VMSC/MSC or a SGSN for a CS-MO-LR or PS-MO-LR, respectively, to a gateway mobile location center. Information related to the user like location information associated with the user or a user identity may be also transmitted or determined via the mobile originated location request that is also preferably adapted to trigger the sending of information enabling the contacting of the user. In a corresponding manner, the implementation effort may be further lowered if an existing gateway mobile location center is modified in order to provide functionality associated with the server, e.g. to receive the type identifier, to execute the analysis of the received type identifier for the determination of one or more location service clients associated with the selected type of location service clients, the determination of the at least one address of the one or more determined location service clients, the optional execution of the limitation or restriction, and the sending of information enabling the contacting of the user optionally supplemented by location information associated with the user.

For charging the one or more location service clients to those the information enabling the contacting of the user is sent, a charging data record can be created. The charging data record can be created by the server, e.g. gateway mobile location center, and can be sent to a charging server. The charging server can provide a location service client with an invoice based on a received charging data record. A corresponding address of the notified location service client to which the invoice is sent can be provided to the charging server. Preferably, the charging server collects multiple charging data records for a location service client and provides said location service client with invoices related to time periods, e.g. monthly invoices.

The present invention also concerns devices order to implement the method as described above. A server of a telecommunication system is described first and than a mobile device.

The server comprises a receiving unit for receiving messages, a transmitting unit for sending messages, and a processing unit for processing messages and information. The receiving unit is adapted to receive a type identifier from a mobile device of a user. The type identifier identifies a selected type of location service clients. The processing unit is adapted to execute an analysis of the type identifier for a determination of one or more location service clients associated with the selected type of location service clients and to execute a determination of at least one address of the one or more determined location service clients according to a result of the analysis. The transmitting unit is adapted to execute a sending of information enabling the contacting of the user to the one or more location service clients whose addresses are determined.

According to a preferred embodiment, the receiving unit of the aforementioned server is adapted to receive location information associated with the user and the transmitting unit of the aforementioned server is adapted to send the location information associated with the user to the one or more location service clients whose addresses are determined.

According to another preferred embodiment of the server, the receiving unit is adapted to receive a threshold number. The threshold number indicates a limit for a number of location service clients and can be entered into the server, e.g. by an operator or remotely by the user. The processing unit is adapted to execute a determination that the threshold number is reached and to limit to the threshold number the number of the one or more location service clients to those information enabling the contacting of the user is to be sent to.

According to another preferred embodiment of the server, the receiving unit is adapted to receive location information associated with the user and location information associated with the one or more location service clients of the selected type of location service clients. The processing unit is adapted to consider both location information such that only those of the one or more location service clients of the selected type of location service clients are determined whose location information match the location information associated with the user.

According to another preferred embodiment of the server, the server is adapted to perform gateway mobile location center related processes and messages in a mobile originated location request.

According to another preferred embodiment of the server, the processing unit is adapted to generate a charging data record to charge the one or more location service clients to those the information enabling the contacting of the user is sent and the transmitting unit is adapted to send the charging data record to a charging server for charging said one or more location service clients.

Preferably, the processing unit of the server is adapted to identify the selected type of location service clients being composed of at least two types of location service clients. In addition or alternatively, the transmitting unit of the server can be adapted to send an indication of the one or more location service clients whose addresses are determined to the mobile device.

In the following, a mobile device is described. The mobile device comprises a receiving unit for receiving messages, a transmitting unit for sending messages, and a processing unit for processing messages and information. The processing unit is adapted to execute a selection of a type of location service clients on the mobile device. The transmitting unit is adapted to execute a sending of a type identifier to a server in a telecommunication system. The type identifier identifies the selected type of location service clients.

According to a preferred embodiment of the mobile device, the receiving unit is adapted to receive location information associated with a user of the mobile device. The receiving unit can be for example a keyboard or microphone that is used by the user to enter the location information associated with the user to the mobile device. Other receiving units are possible. The transmitting unit is adapted to send the location information associated with the user to the server.

Preferably, the receiving unit of the mobile device is adapted to receive an indication of one or more location service clients whose addresses are determined on the server as a result of the sending of the type identifier and the processing unit of the mobile device is adapted to process the received indication for an indication of the one or more service clients whose addresses are determined on an output unit, a display or a loudspeaker, accessible by the user. Alternatively or in addition, the mobile device can be adapted to perform mobile device related processes and messages in a mobile originated location request.

The present invention also concerns computer programs comprising portions of software codes in order to implement the method as described above when operated on the server or the mobile device. The computer programs can be stored on a computer readable medium. The computer-readable medium can be a permanent or rewritable memory within the server or the mobile device or located externally. The respective computer program can be also transferred to the server or the mobile device center for example via a cable or a wireless link as a sequence of signals.

A computer program loadable into a processing unit of a server of a telecommunication system is described. The computer program loadable into a processing unit of a server of a telecommunication system comprises code adapted to execute an analysis of a type identifier identifying a selected type of location service clients for a determination of one or more location service clients associated with the selected type of location service clients and to execute a determination of at least one address of the one or more determined location service clients according to a result of the analysis, and to trigger a sending of information enabling the contacting of a user of a mobile device from which the type identifier originates to the one or more location service clients whose addresses are determined.

A computer program loadable into a processing unit of a mobile device is described. The computer program loadable into a processing unit of a mobile device comprises code adapted to execute a selection of a type of location service clients and to trigger a sending of a type identifier to a server in a telecommunication system. The type identifier identifies the selected type of location service clients.

In the following, detailed embodiments of the present invention shall be described in order to give the skilled person a full and complete understanding. However, these embodiments are illustrative and not intended to be limiting, as the scope of the invention is defined by the appended claims.

DETAILED DESCRIPTION OF THE INVENTION

The following description focuses on the steps associated with messages or processes for carrying out the invented method. Depending on the implementation or case, it may be advantageous to integrate additional steps like a confirmation of a step before the next step is carried out. One or more pre-initialization steps can ensure the inter-operability of the respective devices involved in the method.

Figure 1A:
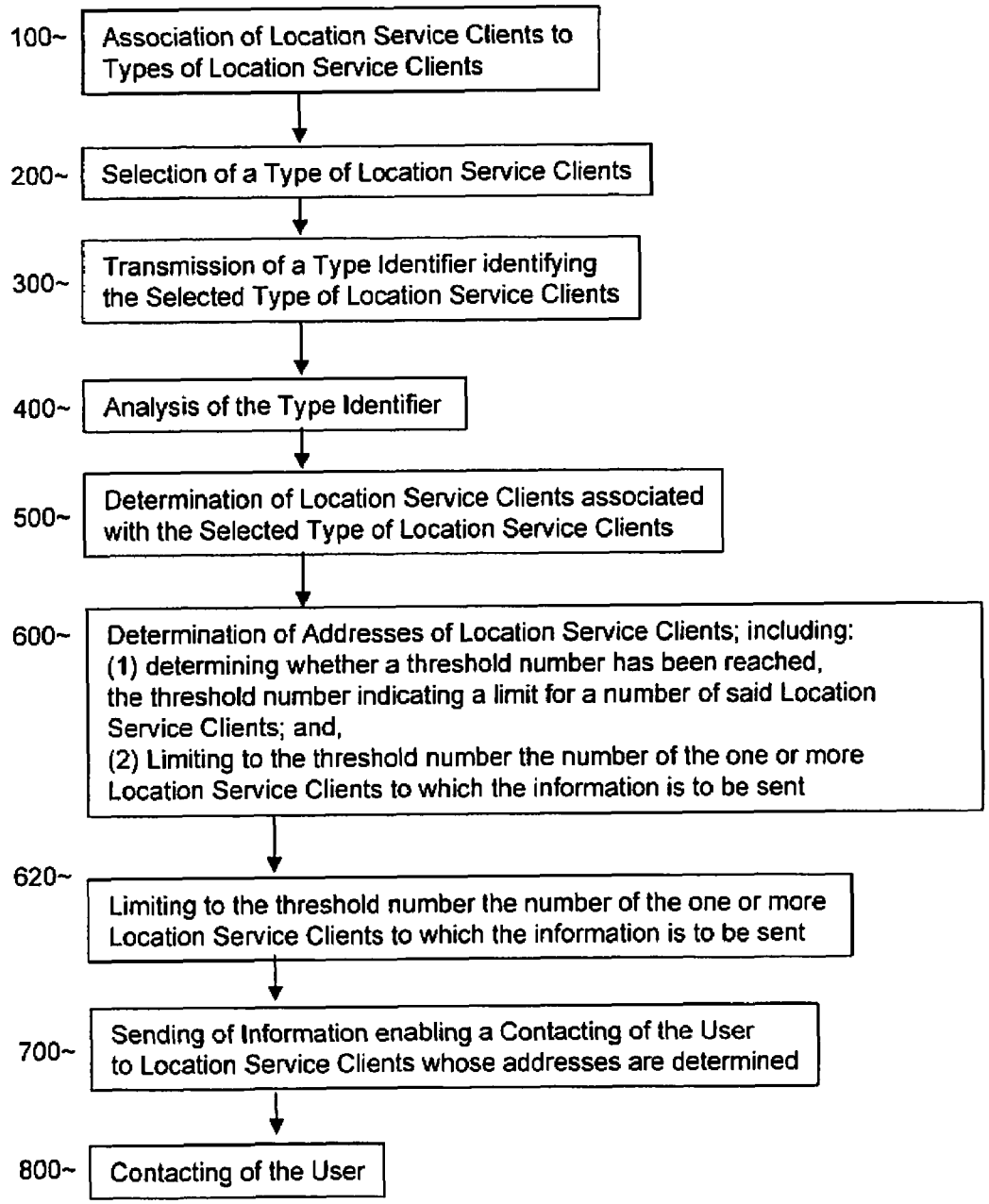
FIG. 1a shows a flow-chart diagram of a first embodiment of the present invention.
Figure 1B:
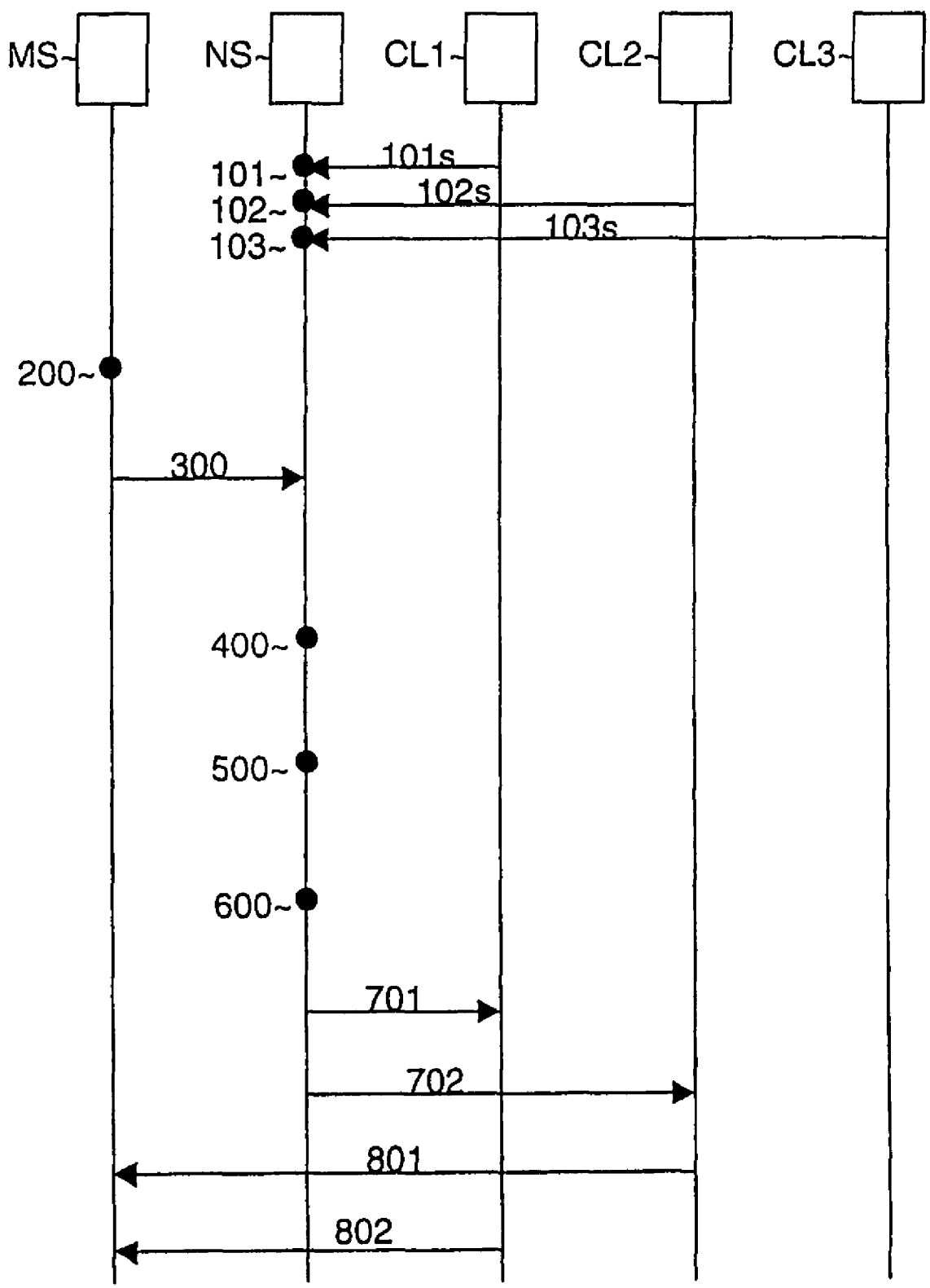
FIG. 1b shows exemplary messages and processes of the first embodiment of the present invention.

FIG. 1a shows a flow-chart diagram of a first embodiment of the present invention and FIG. 1b shows exemplary processes executed on devices like a mobile device MS for a user, a server NS, a first location service client CL1, a second location service client CL2, and a third location service client CL3, exemplary processes executed on said devices, and exemplary messages between said devices for executing the first embodiment. In a first step, the location service clients CL1,CL2,CL3 are associated with types of location service clients. The association 100 may be executed 101,102,103 for the three location service clients CL1,CL2,CL3 by the server NS. Alternatively, the three location service clients CL1,CL2, CL3 may subscribe 101s,102s,103s for association 100. IP (Internet Protocol) group member management mechanisms as for multicast or anycast can be applied for the subscription. Location information associated with the location service clients CL1,CL2,CL3 may be also provided to the server NS in conjunction with the association 100. As an example to be used for explaining the following steps: the first location service client CL1 and the second location service client CL2 subscribe 101s,102s to a first type of location service clients and the third location service client CL3 does not subscribe 103s to the first type of location service clients but instead to a second type of location service clients. When the user wants to be contacted by location service clients of the first type of location service clients, e.g. for receiving service information from these location service clients, a selection 200 of the first type of location service clients is executed on the mobile device MS. Preferably, the name of the first type of location service clients and the corresponding type identifier are already known to the mobile device MS, e.g. this information may be provided when the user subscribes to a service according to the present invention. Preferably, a scrolling list comprising types of location service clients is available on the mobile device MS with each type of location service clients being uniquely associated with a corresponding type identifier. From that list said first type of location service clients can be selected and the corresponding type identifier can be obtained. Alternatively, the name of the first type of location service clients and/or the corresponding type identifier may be entered into the mobile device MS. The user can confirm the selection 200 of the first type of location service client, e.g. by pressing a button. Alternatively or in addition, it can be advantageous to select a specific type of location service clients by pressing a dedicated button that effects the selection of the specific type of location service clients and the immediate transmission 300 of the corresponding type identifier. Such a scenario may apply for location service clients to be notified in emergency situations, e.g. location service clients of the type POLICE or HOSPITAL may be notified with information enabling the contacting of the user and the current location of the user when pressing an emergency button.

Next, the transmission 300 of the corresponding type identifier for identifying the selected first type of location service clients to the server NS is executed from the mobile device MS to the server NS. Depending on the implementation, the transmission 300 of the type identifier may be executed within the frame of an explicit request for service to the server NS, i.e. to determine location service clients according to the selected first type of location service clients and to send information enabling the contacting of the user and optionally location information associated with the user to the determined location service clients. Location information associated with the user may be provided to the server NS from the mobile device MS, e.g. within the transmission 300 of the type identifier, or from further entities of the telecommunication system. Alternatively to the explicit request mentioned before, the reception of the type identifier identifying the selected first type of location service clients may trigger the server NS to proceed according to the proposed method.

The server NS executes an analysis 400 of the received type identifier for a determination 500 of the location service clients CL1,CL2 associated with the selected first type of location service clients. If the type identifier is not known to the server NS or is invalid, the determination 500 may be aborted. Alternatively or in addition, the mobile device MS can be informed about the unknown or invalid type identifier or the abortion of the determination 500. Else, the server NS proceeds with the determination 600 of the addresses of the location service clients CL1,CL2 associated with the selected first type of location service clients. Furthermore, the server NS can check for limitations or restrictions, e.g. if the number of location service clients is to be limited according to a threshold number or whether location information associated with the user matches location information associated with the location service clients CL1,CL2 of the selected first type of location service clients. For the determination 600 of the addresses of the location service clients of the selected first type on the server NS, the server NS can search in a database for the addresses of the location service clients that match the selected first type and fulfill requirements according to possible limitations and/or restrictions if applicable. According to the present example, the address of the first location service client CL1 and the address of the second location service client CL2 are determined on the server NS. The mobile device MS may receive an information on the determination 600 supplemented with a number or names of location service clients whose addresses are indicated (messages and processes related to the information on the determination 600 are not shown in FIG. 1). Depending on the implementation, the user may confirm the determined location service clients as indicated to him by the received information and send corresponding confirmation to the server (messages and processes related to the confirmation are not shown in FIG. 1). However, in order to save transmission effort, the transmission of information on the determined location service clients and the subsequent confirmation may be skipped. The server NS may check for further service requested by the user. Following the present example of FIG. 1, the server NS executes the sending 700 of information enabling the contacting of the user to the location service clients CL1,CL2. The server NS sends 701, 702 the MSISDN number of the mobile device MS to the location service clients CL1,CL2 with the MISDN number serving as information enabling the contacting of the user. Further information may be sent also to the location service clients CL1,CL2, e.g. location information associated with the user. The notified location service clients CL1,CL2 may execute a contacting 800 of the user in response to the receipt of the MSISDN number of the mobile device MS.

According to the present example, the notified location service clients CL1,CL2 send 801,802 service information to the mobile device MS. For a location based service, location information associated with the location service clients CL1, CL2 and an indication for services offered by the location service clients CL1,CL2 may be sent 801,802. For example if the user selects the type of location service clients "RESTAURANT", the location service clients CL1,CL2 being associated to that type "RESTAURANT", send 801,802 service information comprising e.g. a menu card, special offers, and the location of the location service clients CL1,CL2 to the mobile device MS of the user. The service information may comprise a description of a way from the location associated with the user to a location associated with a location service client if both location information are known to said location service client.

Figure 2:
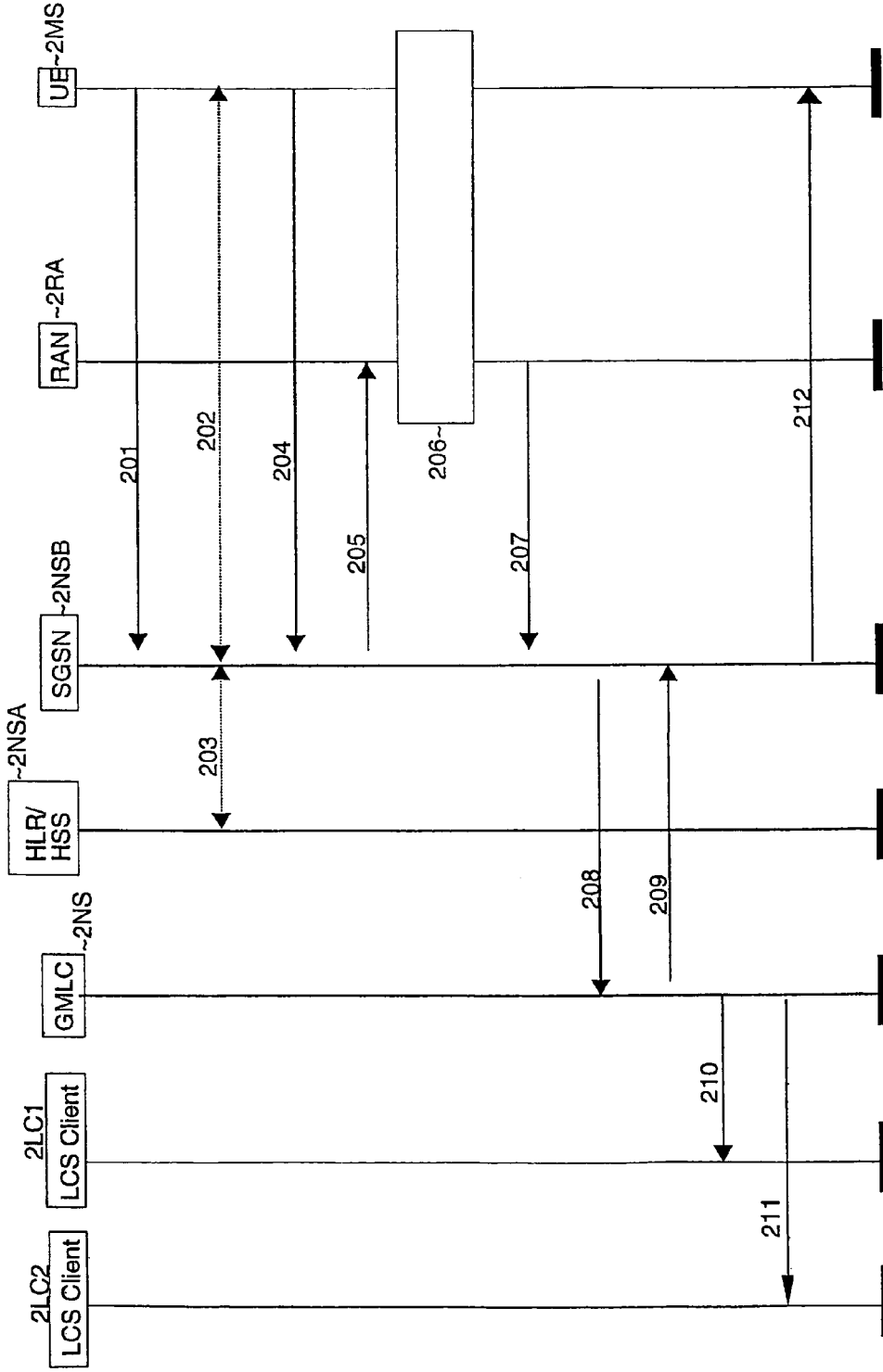
FIG. 2 shows a message flow diagram according to a second embodiment of the present invention.

FIG. 2 shows a procedure of a mobile originated location request for the packet switched domain (PS-MO-LR) according to $3^{rd}$ Generation Partnership Project (3GPP) Technical Specification (TS) 23.272 Version (V)5.3.0, Release 5, published June 2002 (2002-06) modified for executing the present invention. In a first step, the UE (user equipment), i.e. the mobile device 2MS, requests a PS signaling connection and sends a service request 201 indicating signaling to a SGSN 2NSB via the RAN (Radio Access Network) 2RA. If the mobile device 2MS already has a PS signaling connection, the mobile device 2MS does not need to send the service request 201. Security functions may be executed as described in $3^{rd}$ Generation Partnership Project (3GPP) Technical Specification (TS) 23.060 Version (V)5.2.0, Release 5, published June 2002 (2002-06). For executing a security function, messages 202,203 between the mobile device 2MS, the SGSN 2NSB and a HLR/HSS (Home Location Register/Home Subscriber Server) 2NSA can be exchanged as indicated in FIG. 2. Before sending a modified service invoke message 204, a selection of a type of location service clients is executed on the mobile device 2MS. A corresponding type identifier for identifying the selected type of location service clients at the GMLC 2NS is included into the modified service invoke message 204 to the SGSN 2NSB e.g. by replacing an identity of a location service client in the service invoke message according to prior art by the selected type identifier. The such modified service invoke message 204 can further request that the current location of the mobile device 2MS is to be determined and to be sent to the location service clients of the selected type of location service clients. As a consequence, a location request 205 and messages 206 for individual positioning methods of the current location of mobile device 2MS can be performed. A location report 207 provides the current location of the mobile device 2MS to the SGSN 2NSB. However, the determination of the current location of the mobile device 2MS of the user according to FIG. 2 via messages 205,206,207 is signaling intensive. In order to save transmission effort, location information associated with the user may be provided to the SGSN 2NSB by different entities of the telecommunication network: the current location of the mobile device 2MS on SGSN level or on routing area level is known to the SGSN 2NSB and the current location of the mobile device 2MS on cell level is known to the RAN 2RA. The SGSN 2NSB may search in its database for the current location of the mobile device 2MS on SGSN level or routing area level or may request the current location of the mobile device 2MS from the RAN 2RA with cell level accuracy. Additional messages not shown in FIG. 2 may be necessary to provide the GMSC with current location information from the different entities as explained before. Alternatively, location information associated with the user may be provided from the mobile device 2MS to the SGSN 2NSB via or in parallel with the modified service invoke message 204. This is advantageous as messages 205,206,207 are not necessary and in addition, arbitrary location information can be provided to the SGSN 2NSB. The SGSN 2NSB sends a message according to a modified subscriber LCS report 208 to the GMLC 2NS comprising the type identifier as retrieved from the modified service invoke message 204 and an user identity for identifying the user, e.g. a MSISDN or Packet Data Protocol (PDP) address of the user as it is the case for the subscriber LCS report according to prior art or an IMSI related to the user. Alternatively or in addition to the user identity, the modified subscriber LCS report 208 can comprise information enabling the contacting of the user. Correspondingly, the modified subscriber LCS report 208 can comprise further entries of the subscriber LCS report according to prior art, e.g. the current location of the mobile device 2MS. In addition or alternatively, the modified subscriber LCS report may carry arbitrary location information related to the user not limited to the current location of the mobile device 2MS of the user making the proposed procedure much more versatile as explained in more detail in conjunction with FIGS. 3 and 4.

The GMLC 2NS obtains the type identifier from the modified subscriber LCS report 208. The type identifier identifies the selected type of location service clients to the GMLC 2NS and the location service clients that are associated to the selected type of location service clients and their corresponding addresses can be determined, e.g. obtained from a database of the GMLC 2NS. Furthermore, the GMLC 2NS can make use of the user identity mentioned before to determine the information enabling the contacting of the user. For example the GMLC 2NS searches its database for user accessible receiving entities like addresses of devices or email addresses related to said user identity. Alternatively or in addition, the GMLC 2NS can use the MSISDN number of the mobile device 2MS as user identity or as information enabling the contacting of the user or for both. Further checks may be executed, e.g. if location information associated with the user matches with location information associated with the location service clients of the selected type. Location information associated with the user may be obtained from the modified subscriber LCS report 208. Alternatively or in addition, location information associated with the user or location information associated with the location service clients or both can be stored on a database of the GMLC 2NS that can access the respective information based on the knowledge of the user identity and received type identifier, respectively. Subsequently, the addresses of the location service clients that are associated with the selected type of location service clients and optionally fulfill the requirements of further checks for limitation or restriction are determined on the GMLC 2NS, i.e. the addresses of a first location service client 2LC1 and a second location service client 2LC2 according to the present example. A further check may also be a check for a time, e.g. the time when the service invoke message 204 is sent or a time entered by the user to the service invoke message 204 for further restriction of the location service clients to be notified. As an example, if the user requests that location service clients of the selected type of location service clients are to be notified for an offer of service to the user and the service invoke message 204 has been sent at a time T0, location service clients of the selected type offering no service at or after T0 are preferably not notified with information enabling the contacting of the user in order to save transmission and processing effort and in order to avoid that location service clients that do not want to be notified at or after T0 are annoyed by unwanted notifications. Correspondingly, the user is not annoyed by service information from one or more location service clients of the selected type of location service clients that do not offer service at or after the specified time T0. The GMLC 2NS can send a message 209 according to a subscriber LCS report ack(nowledgement) stating the number or names or both of the determined location service clients to the SGSN 2NSB. Said number or names or both may be further sent, e.g. via message 212, to the mobile device 2MS, for an indication on the mobile device. The user may confirm to the GMLC 2NS the determined location service clients that are indicated to him or may perform a selection of the determined location service clients that are indicated to him and inform the GMLC 2NS about his selection. Processes and messages that are used to execute the confirmation of the determined location service clients or the selection of the determined location service clients and the related information for the GMLC 2NS are not depicted in FIG. 2. The GMLC 2NS may wait for the confirmation before sending the information enabling the contacting of the user to the location service clients whose addresses are determined. If a selection on the determined location service clients has been made on the mobile device 2MS, e.g. in the sense that the user sends a reply that he does not want that a subset of the one or more location service clients whose addresses are determined are notified with information enabling the contacting of the user, the GMLC 2NS can react accordingly by sending information enabling the contacting of the user to only those of the one or more location service clients whose addresses are determined that do not belong to the unwanted subset. If the aforementioned confirmation or information on selection is not received by the GMLC 2NS e.g. in a given time period, the GMLC may terminate the procedure after the time period expires such that the determined location service clients are not notified with information enabling the contacting of the user. Alternatively, the GMLC can send the information enabling the contacting of the user to all of the one or more location service clients whose addresses are determined. According to the example of FIG. 2, a confirmation on the determined location service clients by the user or a selection of the determined location service clients by the user is not depicted and the GMLC 2NS proceeds with the sending of messages 210,211 to the location service clients 2LC1 ,2LC2 with the messages 210,211 comprising information enabling the contacting of the user. The messages 210,211 can comprise also further information like location information associated with the user, a time, or a service request.

Based on the knowledge of the received information enabling the contacting of the user, the notified location service clients 2LC1,2LC2 can contact the user, e.g. by a separate call, by SMS (Short Message Service) or MMS (Multimedia Messaging Service) or email or further ways depending on the information for contacting of the user provided to the notified location service clients 2LC1,2LC2. Also other devices than the mobile device 2MS may be used for contacting the user by the location service clients LC1, LC2. Messages for contacting the user are not shown in FIG. 2; For a CS-MO-LR, a corresponding procedure as described in conjunction with FIG. 2 for a PS-MO-LR can be used.

Figure 3:
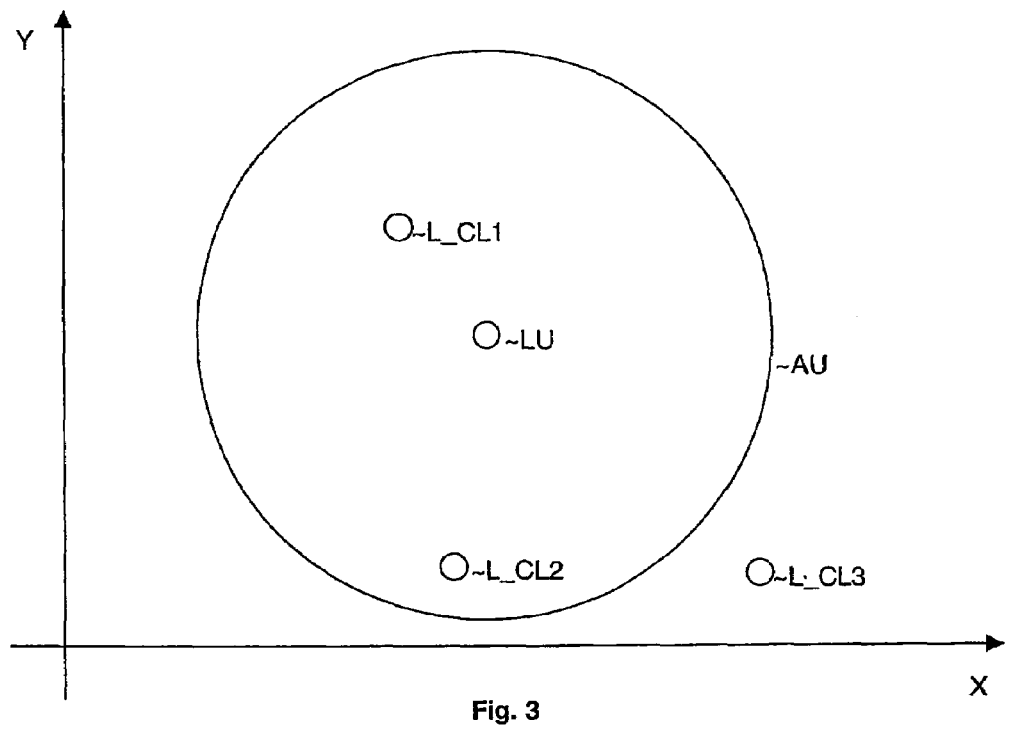
FIG. 3 shows a first example for location information associated with the user and location information associated with location service clients.

FIG. 3 is used to explain a restriction of a determination of location service clients by location information. Shown are a location LU associated with the user, e.g. the current or future location of the user, and locations L_CL1,L_CL2,L_CL3 associated with three location service clients of a same type of location service clients in a x-y-coordinate system representing geographical coordinates. The location LU for the user is surrounded by an area AU. The area AU can be used to instruct a GMLC to notify only location service clients located within the area AU. According to FIG. 3, the first location service client and the second location service client are located within the area AU and the third location service client is located outside the area AU. Although all three location service clients are of the same type of location service clients, the restriction effects that only the first location service client and the second location service client are notified with information enabling the contacting of the user. The third location service client is not notified because the location L_LC3 is outside the area AU.

The area AU may be set by the user for the restriction of location service clients associated with the selected type of location service clients to location service clients associated with the selected type of location service clients that fit to personal needs of the user If the user is looking for a restaurant in walking-distance from its current position, the user may not like to receive offers from restaurants exceeding walking distance. According to this example, the user may define a radius according to his personal walking behavior for setting up the area AU. The radius can be sent via the modified service invoke message and the modified subscriber LCS report to the GMLC according to FIG. 2. The current location of the user may be derived from a location estimation provided to the GMLC via the modified subscriber LCS report. Alternatively, the area AU may represent a predefined area like a district of a town. If the user wants to receive service information from location service clients of a selected type of location service clients located in a predefined area, e.g. Berlin Downtown, an indication of the predefined area can be sent to the server for restriction purpose (server not shown in FIG. 3).

Location information associated with a location service client to be matched by a location associated with a user is a further requirement for a restriction of the location service clients that are to be notified. If the location associated with a user is outside an area associated with a location service client, said location service client may not have interest to be notified or that its name is indicated to the user or both. According to this restriction requirement, the sending of information enabling the contacting of the user to the one or more location service clients or the indication of the location service clients to the user or both can be restricted to those of the location service clients of the selected type of location service clients whose location information is matched by the location associated with the user.

Figure 4:
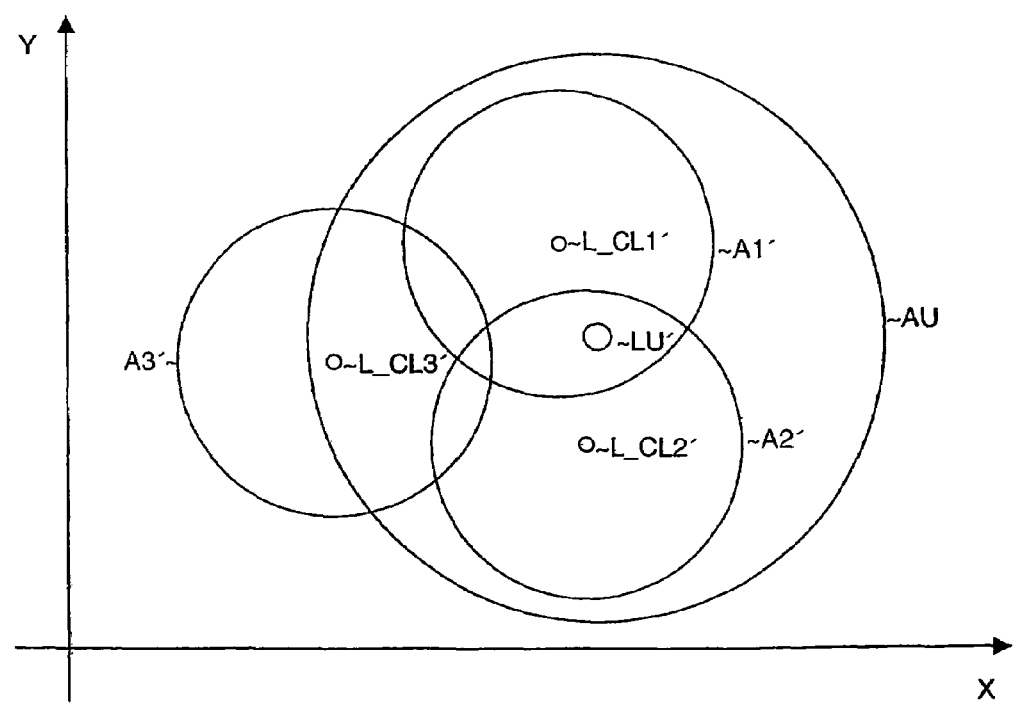
FIG. 4 shows a second example for location information associated with the user and location information associated with location service clients.

FIG. 4 is used to explain a further embodiment of a restriction procedure by location information. A corresponding x-y co-ordinate system with a location LU' associated with the user and an area AU' associated with the user is depicted. The locations L_CL1',LCL_2',LCL_3' of three location service clients match the area AU' associated with the user. In addition, areas A1',A2',A3' surrounding the locations L_CL1', LCL_2',LCL_3' for the three location service are shown. According to the present example, the user selects the first type of location service clients the three location service clients having the locations L_CL1',L_CL_2',LCL_3' are associated with. Although all three location service clients are located within the area AU' associated with the user, only the first location service client having the location L_CL1' and the second location service client having the location L_CL2' are notified by information enabling the contacting of the user or indicated to the user or both due to the restriction set up by the area A3' of the third location service client that is not matched by the location LU' associated with the user.

Figure 5:
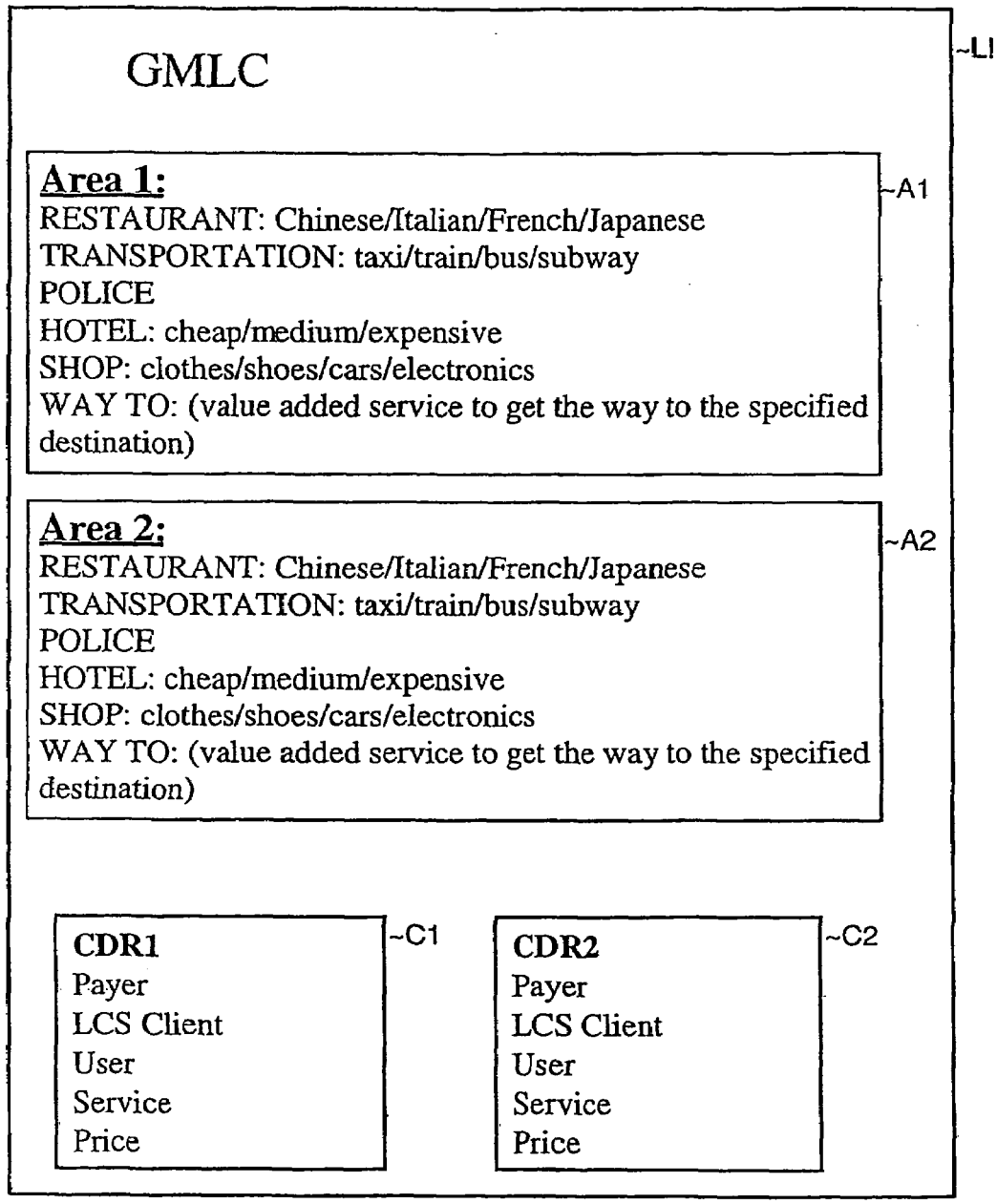
FIG. 5 shows an exemplary database in a GMLC.

FIG. 5 shows an exemplary database LI of a GMLC. The database LI comprises different types of location service clients like RESTAURANT, TRANSPORTATION, POLICE, HOTEL, and SHOP. Optionally it is possible to provide a finer granularity, e.g. Chinese, Italian, French, and Japanese for RESTAURANT, that can be processed as composed types for a finer selection. In addition, the database reveals the entry WAY TO for providing a value added service that e.g. provides the user with a way description from a location associated with the user to a specified destination, e.g. a location associated with a location service client. WAY TO may be indicated from the mobile device to the GMLC by a dedicated identifier or may be handled according to the procedure described in conjunction with the composed types, e.g. composing the types RESTAURANT and Chinese with WAY TO for indicating to the GMLC that the user demands that Chinese restaurants are to be notified with information enabling the contacting of the user and that information revealing the way from a location specified by the user to the notified Chinese restaurants is to be provided to the user. Furthermore, the database LI comprises two areas A1,A2. A location service client may subscribe to one or more of the types of location service clients, and for one or more of the areas A1,A2, and optionally for WAY TO for a value added service as explained above. An exemplary location service client may thus subscribe to TRANSPORTATION and taxi for types of location service clients and Munich for an area. For charging the user for the proposed service that is triggered by the selection of the type of location service clients and the subsequent transmission of the corresponding type identifier, CDRs (Charging Data Records) can be generated in a MSC or SGSN for CS-MO-LR or PS-MO-LR, respectively. For charging a notified location service client, the GMLC can be adapted to create CDRs that can be used to charge the notified location service client. Exemplary CDRs C1,C2 are depicted in FIG. 5 as part of the database LI of the GMLC. In general, a CDR specifies the party that is to be charged for a service. Thus, a CDR may comprise in addition to the indication of the payer that is to be charged by the CDR, an indication of the LCS client that is notified, an indication of the user that sent the corresponding type identifier to the GMLC, an indication for the service, e.g. the value added service WAY TO, and an indication for the price that is charged to the payer. Preferably, the payer is the notified location service client, however, the payer may be also the user or even a third party sponsoring the offered service. Different prices for the two areas A1,A2 may apply to the first CDR C1 and the second CDR C2. Post processing of a CDR may be carried out in a charging server for charging the respective payer. Other embodiments of a database of the GMLC, other types, areas or CDRs than those that are depicted in FIG. 5 are possible.

Figure 6:
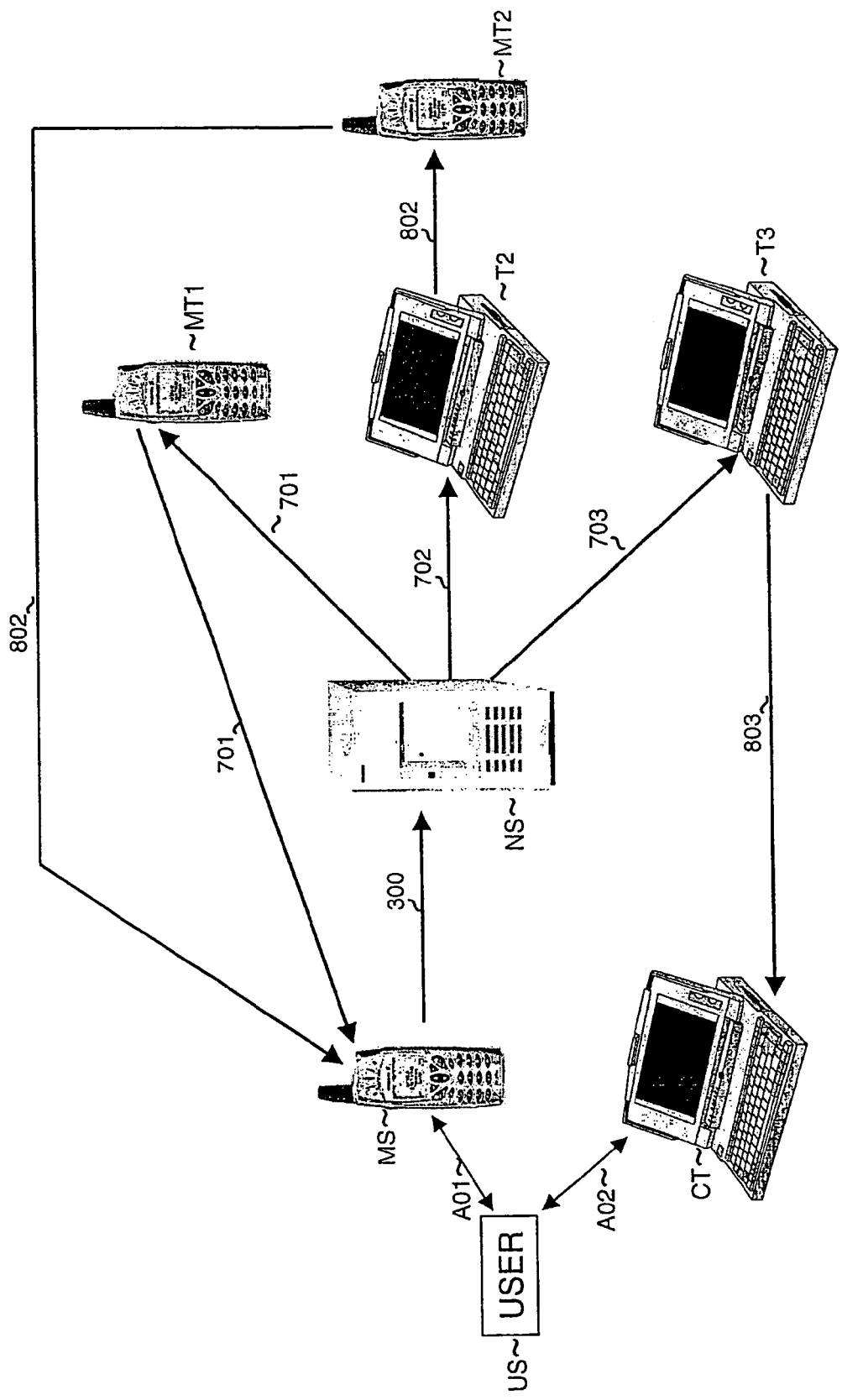
FIG. 6 shows exemplary devices and messages between the devices for carrying out the invention.

FIG. 6 depicts exemplary devices and messages between the devices for carrying out the proposed method. FIG. 6 corresponds to FIG. 1b with the difference that a third client is now introduced that is associated with the selected type of location service clients and that is notified with information enabling the contacting of the user. In addition, an indication for the user US is given who can access A01,A02 a mobile device MS and a computer terminal CT for accessing service information from notified location service clients. Note that the user US does not necessarily have to be a human being but may also be a computing device that triggers the proposed method and that can be contacted e.g. with service information by a notified location service client. For the transmission 300 of the type identifier identifying a selected type of location service clients where the three location service clients are associated with, the user US uses his mobile device MS that sends the type identifier to the server NS. From the knowledge of the received type identifier, the server NS determines the three location service clients and their addresses. According to the present example the server may determine a MSISDN number of a mobile device MT1 for the first location service client, and a first email address accessible for the second location service client by a computer terminal T2, and a further email address accessible for the third location service client by a computer terminal T3. Furthermore, in the present example the server NS is aware about the information enabling the contacting of the user, i.e. the MSISDN number of the mobile device MS and an email address accessible for the user US via the computer terminal CT. The server sends 701,702,703 three messages comprising this information enabling the contacting of the user to the respective determined addresses of the three location service clients, e.g. it sends 701 an SMS to the mobile device MT1 of the first location service client, an email to the email address of the second location service client, and an email to the email address of the third location service client. The notified location service clients may decide on their own which information for contacting the user US is chosen and how the user is to be contacted. The first and second location service clients may choose to send 801,802 service information via SMS to the MSISDN number of the mobile device MS of the user US. The third client may find it more appropriate to send 803 service information via email to the email address of the user US. Information related to the user US like e.g. the identity of the user US or location information associated with the user US can be comprised in the aforementioned messages 300, 701,702,703,801,802,803. Additional messages can be introduced for transferring information related to the user US or service information. For example, the second location service client uses a computer terminal T2 for receiving the information enabling the contacting of the user from the server NS. For contacting the user US via the mobile device MT2, service information is transferred 802' from the computer terminal T2 to the mobile device MT2 before the service information is sent 802 from the mobile device MT2 of the second location service client to the mobile device MS of the user US.

The exemplary devices described in conjunction with FIG. 6 can be used in a MO-LR triggered by the mobile device MS of the user. For a PS-MO-LR a RAN, a SGSN, and a HLR/HSS have to be added in correspondence with the description given in conjunction with FIG. 2. Corresponding messages between the respective devices have to be added or modified appropriately. The aforementioned exemplary devices can be used also in a CS-MO-LR.

The invention claimed is:

1. A method for enabling one or more of a plurality of location service clients (LSCs) to contact a user of a mobile device, wherein the method comprises the steps of:
   selection of at least one authorized LSC type on the mobile device, said at least one authorized LSC type selected from type identifiers associated with said plurality of LSCs;
   transmission of one or more type identifiers from the mobile device to a server in a telecommunication system, the one or more type identifiers identifying the selected at least one authorized LSC type;
   analysis of the type identifier by said server to determine one or more LSCs associated with the selected type;
   determination of at least one address of the one or more LSCs associated with the selected type;
   determining whether a threshold number has been reached, the threshold number indicating a limit for a number of said LSCs;
   limiting to the threshold number the number of the one or more LSCs to which said information is to be sent; and,
   sending information from said server to the at least one address of the one or more LSCs associated with the selected type, said information enabling said one or more LSCs to contact said mobile device.

2. The method according to claim 1, further comprising the step of sending location information associated with the mobile device to the at least one address of the one or more LSCs associated with the selected type.

3. The method according to claim 1, further comprising the step of comparing location information associated with the mobile device and location information associated with the one or more LSCs, wherein the sending of information enabling contacting of the mobile device by said one or more LSCs is restricted to LSCs whose location information matches the location information associated with the mobile device.

4. The method according to claim 3, wherein the location information associated with the mobile device is the current location of the mobile device.

5. The method recited in claim 1, wherein a charging data record is created to charge the one or more LSCs to which the information enabling the contacting of the mobile device is sent.

6. A server of a telecommunication system operative to enable one or more of a plurality of location service clients (LSCs) to contact a user of a mobile device, said server operative to:
receive one or more type identifiers from the mobile device, said one or more type identifiers identifying at least one authorized LSC type selected on said mobile device, said at least one authorized LSC type selected from type identifiers associated with said plurality of LSCs;
analyze the type identifier to determine one or more LSCs associated with the selected type;
determine at least one address of the one or more LSCs associated with the selected type;
determine whether a threshold number has been reached, the threshold number indicating a limit for a number of said LSCs;
limit to the threshold number the number of the one or more LSCs to which said information is sent; and,
send information to the at least one address of the one or more LSCs associated with the selected type, said information enabling said one or more LSCs to contact said mobile device.

7. The server according to claim 6, wherein said server is further operative to send location information associated with the mobile device to the at least one address of the one or more LSCs associated with the selected type.

8. The server according to claim 6, wherein said server is further operative to compare location information associated with the mobile device and location information associated with the one or more LSCs, wherein the sending of information enabling contacting of the mobile device by said one or more LSCs is restricted to LSCs whose location information matches the location information associated with the mobile device.

9. The server according to claim 8, wherein the location information associated with the mobile device is the current location of the mobile device.

10. The server recited in claim 6, wherein a charging data record is created to charge the one or more LSCs to which the information enabling the contacting of the mobile device is sent.

* * * * *